United States Patent
Hosoya et al.

(10) Patent No.: US 10,025,295 B2
(45) Date of Patent: Jul. 17, 2018

(54) MOTOR POWER INTERRUPTING DEVICE OF INJECTION MOLDING MACHINE

(71) Applicant: FANUC CORPORATION, Minamitsuru-gun, Yamanashi (JP)

(72) Inventors: Yuichi Hosoya, Yamanashi (JP); Hideki Koyama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 128 days.

(21) Appl. No.: 14/081,399

(22) Filed: Nov. 15, 2013

(65) Prior Publication Data

US 2014/0152230 A1 Jun. 5, 2014

(30) Foreign Application Priority Data

Nov. 30, 2012 (JP) ................. 2012-262151

(51) Int. Cl.
*G05B 19/416* (2006.01)
*B29C 45/84* (2006.01)
*B29C 45/76* (2006.01)

(52) U.S. Cl.
CPC ........ *G05B 19/416* (2013.01); *B29C 45/7666* (2013.01); *B29C 45/84* (2013.01); *B29C 2945/76521* (2013.01); *B29C 2945/76939* (2013.01); *B29C 2945/76953* (2013.01)

(58) Field of Classification Search
USPC ...................................................... 318/625
See application file for complete search history.

(56) References Cited

U.S. PATENT DOCUMENTS

| 5,591,385 A * | 1/1997 | Arai ..................... B29C 45/768 264/328.16 |
| 6,477,441 B1 * | 11/2002 | Sagasaki ............ G05B 19/4145 700/160 |
| 2001/0019184 A1 * | 9/2001 | Usui ..................... B29C 45/84 264/40.1 |

(Continued)

FOREIGN PATENT DOCUMENTS

| CN | 102380941 A | 3/2012 |
| CN | 102582054 A | 7/2012 |

(Continued)

OTHER PUBLICATIONS

Decision to Grant a Patent dated Jun. 3, 2014, corresponds Japanese patent application No. 2012-262151. Office Action dated Sep. 30, 2015, corresponding to German Patent Application No. 102013019683.3.

*Primary Examiner* — Eduardo Colon Santana
*Assistant Examiner* — Said Bouziane
(74) *Attorney, Agent, or Firm* — Hauptman Ham, LLP

(57) ABSTRACT

A controller of an injection molding machine stores used/unused information in relation to each of the maximum number of controllable servo amplifiers, outputs an interruption request signal requesting power interruption in a lump to apart of or all of these plurality of servo amplifiers, and receives a power interruption confirmation signal confirming that the motor power of the servo amplifiers is interrupted. Further, the controller determines, on the basis of the interruption request signal, the power interruption confirmation signal and the used/unused information, whether or not interruption driving the servo motor is normally operated.

13 Claims, 6 Drawing Sheets

(56) References Cited

U.S. PATENT DOCUMENTS

| | | | |
|---|---|---|---|
| 2001/0026816 A1* | 10/2001 | Usui | B29C 45/76 425/135 |
| 2003/0003177 A1* | 1/2003 | Miyahara | B29C 45/76 425/136 |
| 2003/0111973 A1* | 6/2003 | Iwashita | G05B 19/19 318/625 |
| 2008/0233228 A1* | 9/2008 | Lindee | A22C 7/0038 425/144 |
| 2009/0246307 A1* | 10/2009 | Ochi | B29C 45/7666 425/165 |
| 2011/0204726 A1* | 8/2011 | Ito | H04B 3/54 307/117 |
| 2012/0027882 A1* | 2/2012 | Komamura | B29C 45/76 425/169 |

FOREIGN PATENT DOCUMENTS

| | | |
|---|---|---|
| JP | S60262617 A | 12/1985 |
| JP | S62208920 A | 9/1987 |
| JP | 4371360 A | 12/1992 |
| JP | 11320644 A | 11/1999 |
| JP | 2002192582 A * | 7/2002 |
| JP | 2002361703 A | 12/2002 |
| JP | 2003-204687 A | 7/2003 |
| JP | 2003189657 A | 7/2003 |
| JP | 2004-154961 | 6/2004 |
| JP | 2010264490 A | 11/2010 |

\* cited by examiner

FIG.4

| | SERVO AMPLIFIER | USED/UNUSED |
|---|---|---|
| 41 | MOLD OPENING AND CLOSING SERVO AMPLIFIER (1) | USED |
| 42 | MOLD OPENING AND CLOSING SERVO AMPLIFIER (2) | UNUSED |
| 43 | EJECTION SERVO AMPLIFIER (1) | USED |
| 44 | EJECTION SERVO AMPLIFIER (2) | UNUSED |
| 45 | INJECTING SERVO AMPLIFIER (1) | USED |
| 46 | INJECTING SERVO AMPLIFIER (2) | USED |
| 47 | SCREW ROTATING SERVO AMPLIFIER (1) | USED |
| 48 | SCREW ROTATING SERVO AMPLIFIER (2) | UNUSED |

MOTOR POWER INTERRUPTING DEVICE OF INJECTION MOLDING MACHINE

RELATED APPLICATIONS

The present application claims priority to Japanese Application Number 2012-262151, filed Nov. 30, 2012, the disclosure of which is hereby incorporated by reference herein in its entirety.

BACKGROUND OF THE INVENTION

1. Field of the Invention

The present invention relates to a motor power interrupting device of an injection molding machine, which interrupts power of a servo motor.

2. Description of the Related Art

An injection molding machine manufacturer lines up various sizes of machines which are different in specifications such as a mold clamping force, an injection pressure, and an injection capacity, so as to form molded articles having various sizes by the injection molding machine. The injection molding machine is provided with a mold opening and closing mechanism, a molded article ejection mechanism, an injection mechanism and a screw rotation mechanism, and a servo motor is used for driving each of the mechanisms.

One servo motor is generally used in each of the mechanisms of the injection molding machine, however, in the case where it is desired to generate great mold clamping force or great injection pressure, great output is generated by synchronously actuating a plurality of servo motors, or the great output is generated by employing a plural winding type servo motor which is provided with a plurality of coils of the servo motor in spite of one serve motor (refer to Japanese Patent Application Laid-Open No. 2003-189657).

The same number of servo amplifiers as the number of the coils of the servo motor are necessary, in which the servo amplifiers drive the servo motors. Accordingly, in the case where a plurality of servo motors are used or the plural winding type servo motor is used, the number of the servo amplifiers used in one injection molding machine is necessarily increased even if the number of the actuating mechanisms is not changed. Some of servo amplifiers have a plurality of servo motor driving means in one servo amplifier unit. The servo motor driving means indicates means which supplies to the coils of the servo motor the electric power for driving the servo motor. Therefore, in the present invention, the servo amplifier in which a plurality of servo motor driving means are provided in one unit is assumed as an assembly of a plurality of servo amplifiers.

The injection molding machine is classified broadly into a mold clamping mechanism portion and an injection mechanism portion. In order to facilitate work for taking the molded articles out of the mold and work for removing resin discharged from an injection nozzle, a movable door is provided in each of a mold area and an injection nozzle area. The mold area is at risk of having a worker be pinched by the molds. The injection nozzle area is at risk of having the worker be burned by the resin discharged out of the nozzle. The injection molding machine is provided with a safety function which protects the worker doing maintenance of the injection molding machine from the risks, and secures safety of the worker.

As the safety function, the movable door is provided with a switch, and is structured such that a signal for interrupting the power of the servo amplifier is output from the switch according to the opening of the movable door (refer to Japanese Patent Applications Laid-Open Nos. 60-262617, 62-208920 and 2002-361703). For example, a servo motor for opening and closing the mold and a servo motor for ejecting molded articles are attached to the mold clamping mechanism portion, and in the case where the movable type door in the mold area opens, the power of the servo motor of the mold clamping mechanism portion is interrupted by detecting a state signal of the movable type door. A servo motor for injecting and a servo motor for rotating a screw are attached to the injection mechanism portion, and in the case where the movable type door in the injection nozzle area opens, the power of the servo motor of the injection mechanism portion is interrupted by detecting a state signal of the movable type door in the injection nozzle area.

The number of the servo amplifiers mounted to the injection molding machine is different according to the specification of the machine, as mentioned above. Further, at least one power interrupting means for interrupting the power of the servo motor is necessary in relation to one servo amplifier.

FIG. 6 is a view describing a mechanism for interrupting power of a conventional servo motor.

In an injection molding machine shown in FIG. 6, the powers of the respective servo motors 13, 16, 26 and 29 provided in the injection molding machine are interrupted by interruption request signals which are output from a controller 90 to respective servo amplifiers 45 46, 47, 41, and 43 driving the servo motors, and interruption confirmation signals for confirming the interruption of the power are output to the controller 90, in the respective servo amplifiers 45, 46, 47, 41 and 43. In FIG. 6, reference numerals 80, 82, 84, 86 and 88 denote interruption request signal transmitting means, reference numerals 81, 83, 85, 87 and 89 denote interruption confirmation signal receiving means, and reference numerals 14, 17, 27 and 30 denote position/speed detectors connected to the respective servo motors 13, 16, 26 and 29.

A problem of the injection molding machine exists in a point that in the case where the number of the servo amplifiers varies according to the machine specification, the corresponding number of interruption request signals to the controller are necessary according to the increase of the number of the servo amplifiers, and a cost increase is caused, in the structure shown in FIG. 6.

SUMMARY OF THE INVENTION

Accordingly, an object of the present invention is to provide a motor power interrupting device of an injection molding machine which can accurately detect an abnormality and secure a safety of a worker in the case where any abnormality is generated in an interruption request signal and a servo amplifier, as well as a cost of the machine is reduced by outputting the interruption request signal requesting the interruption of the motor power in a lump to a part of or all of a plurality of servo amplifiers used in the injection molding machine.

The present invention relates to a motor power interrupting device of an injection molding machine, and the injection molding machine is provided with n (n≥2) number of servo motors which actuate movable portions, m (m≥n) number of servo amplifiers which drive the n number of servo motors, and a controller which controls the m number of servo amplifiers. Further, the controller has an interruption request signal output unit which outputs an interruption request signal requesting power interruption in a lump to a part of or all of the n number of servo amplifiers, a power interruption confirmation signal receiving unit which receives a power interruption confirmation signal confirming that the power of the servo amplifiers is interrupted, the servo amplifiers corresponding to the maximum number of servo amplifiers controllable by the controller, a unit which stores used/unused information corresponding to the information indicating that each of the maximum number of servo amplifiers controllable by the controller is used or unused, and a determining unit which determines, on the basis of the interruption request signal, the interruption confirmation signal and the used/unused information, whether or not the power interruption is normally operated, and is structured such as to interrupt the power of the servo motors by requesting the power interruption to the servo amplifier.

According to the present invention, it is possible to provide the motor power interrupting device of the injection molding machine which can accurately detect the abnormality and secure the safety of the worker in the case where any abnormality is generated in the interruption request signal and the servo amplifier, while reducing the cost of the machine by outputting the interruption request signal requesting the interruption of the motor power in a lump to a part of or all of the servo amplifiers used in the injection molding machine.

BRIEF DESCRIPTION OF THE DRAWINGS

The object and the feature mentioned above and the other objects and features of the present invention become apparent from the following description of embodiments with reference to the accompanying drawings, in which:

FIG. 4 is a view describing a memory in which information relating to "used/unused" of a servo amplifier is stored.

DETAILED DESCRIPTION OF THE PREFERRED EMBODIMENTS

Figure 1:
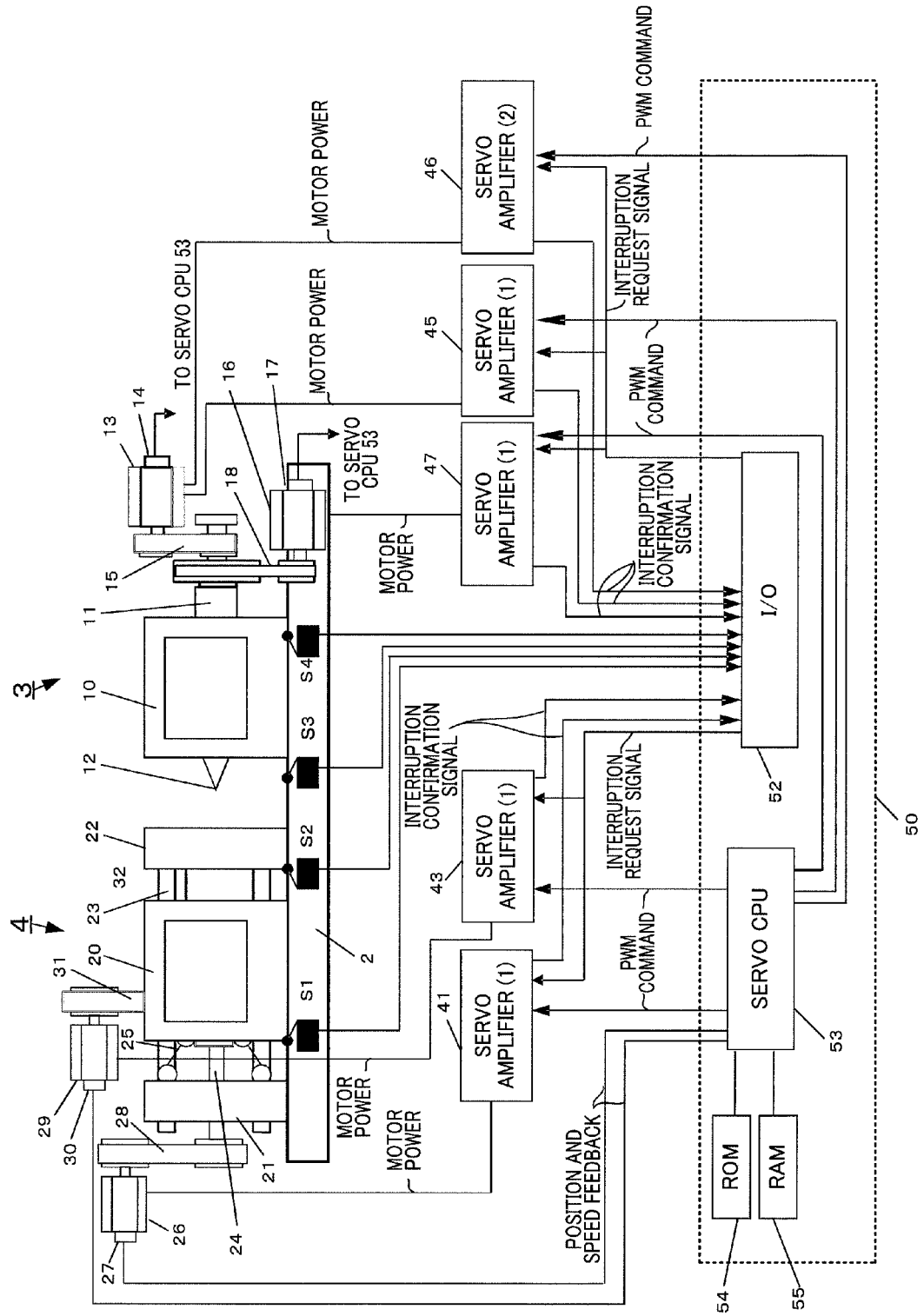
FIG. 1 is a schematic view of an outline of an injection molding machine.

An injection molding machine 1 is constituted by an injection molding machine main body which is provided with an injection mechanism portion 3 and a mold clamping mechanism portion 4 on a machine base 2, and a controller 50 which totally controls the injection molding machine main body, as shown in FIG. 1. The injection mechanism portion 3 heats and melts a resin material (pellet), and injects the molten resin into a cavity of a mold 32. The mold clamping mechanism portion 4 mainly opens and closes the mold 32 (a movable side mold and a fixed side mold).

The injection mechanism portion 3 is provided with an injection cylinder 11. A screw (not shown) is inserted into the injection cylinder 11. A nozzle 12 is attached to a leading end of the injection cylinder 11. Further, the injection mechanism portion 3 is provided with a movable type door 10 in a nozzle area. Sensors (an injection portion side movable door closed state detection switch S3 and an injection portion side movable door opened state detection switch S4) are fixed to the machine base 2, the sensors detecting opening and closing states of the movable type door 10 in the nozzle area.

The screw inserted into the injection cylinder 11 is rotated by a screw rotating motor 16 via a power transmitting means 18 which is constructed by a pulley and a belt, and is driven by an injecting motor 13 via a power transmitting means 15 which includes a mechanism converting a rotary motion of a pulley, a belt and a ball screw/nut mechanism into a linear motion so as to be moved in an axial direction of the screw. In FIG. 1, reference numeral 17 denotes a position/speed detector which detects a rotary position/speed of the screw around an axis of the screw by detecting a position/speed of the screw rotating motor 16, and reference numeral 14 denotes a position/speed detector which detects a position/speed in an axial direction of the screw by detecting a position/speed of the injecting motor 13. Each of detection signals output from the position/speed detectors 14 and 17 is input to a servo CPU 53.

The mold clamping mechanism portion 4 is provided with a mold opening and closing motor 26 which moves forward and backward a movable platen (not shown) for opening and closing the mold, a rear platen 21, an ejection motor 29 for ejecting ejector pins (not shown) which eject a molded article from the mold 32, a fixed platen 22, tie bars 23, the mold opening and closing motor 26, a ball screw 24, and a toggle mechanism 25. Further, the mold clamping mechanism portion 4 is provided with a movable type door 20 in a mold area, and sensors for detecting opening and closing states of the movable type door 20 in the mold area (a mold clamping portion side movable door opened state detection switch S1 and a mold clamping portion side movable door closed state detection switch S2) are fixed to the machine base 2.

The rear platen 21 and the fixed platen 22 are connected by a plurality of tie bars 23, and a movable platen (not shown) is arranged between the rear platen 21 and the fixed platen 22 so as to be guided by the tie bars 23. A fixed side mold is attached to the fixed platen 22, and a movable side mold is attached to the movable platen. The mold 32 is constructed by the fixed side mold and the movable side mold. The toggle mechanism 25 can be operated by moving forward and backward a cross head (not shown) which is attached to the ball screw 24 driven by the mold opening and closing motor 26.

The rotation of the mold opening and closing motor 26 is transmitted to the ball screw 24 via a power transmitting means 28 such as a pulley and a belt. Position/speed of the movable platen can be obtained by detecting position/speed of the mold opening and closing motor 26 while using the position/speed detector 27. The ejector pins (not shown) can be ejected into the mold 32 by driving the ejection motor 29, and the molded article can be ejected out of the mold. Each of the detection signals output from the position/speed detectors 27 and 30 is input to the servo CPU 53.

Figure 2:
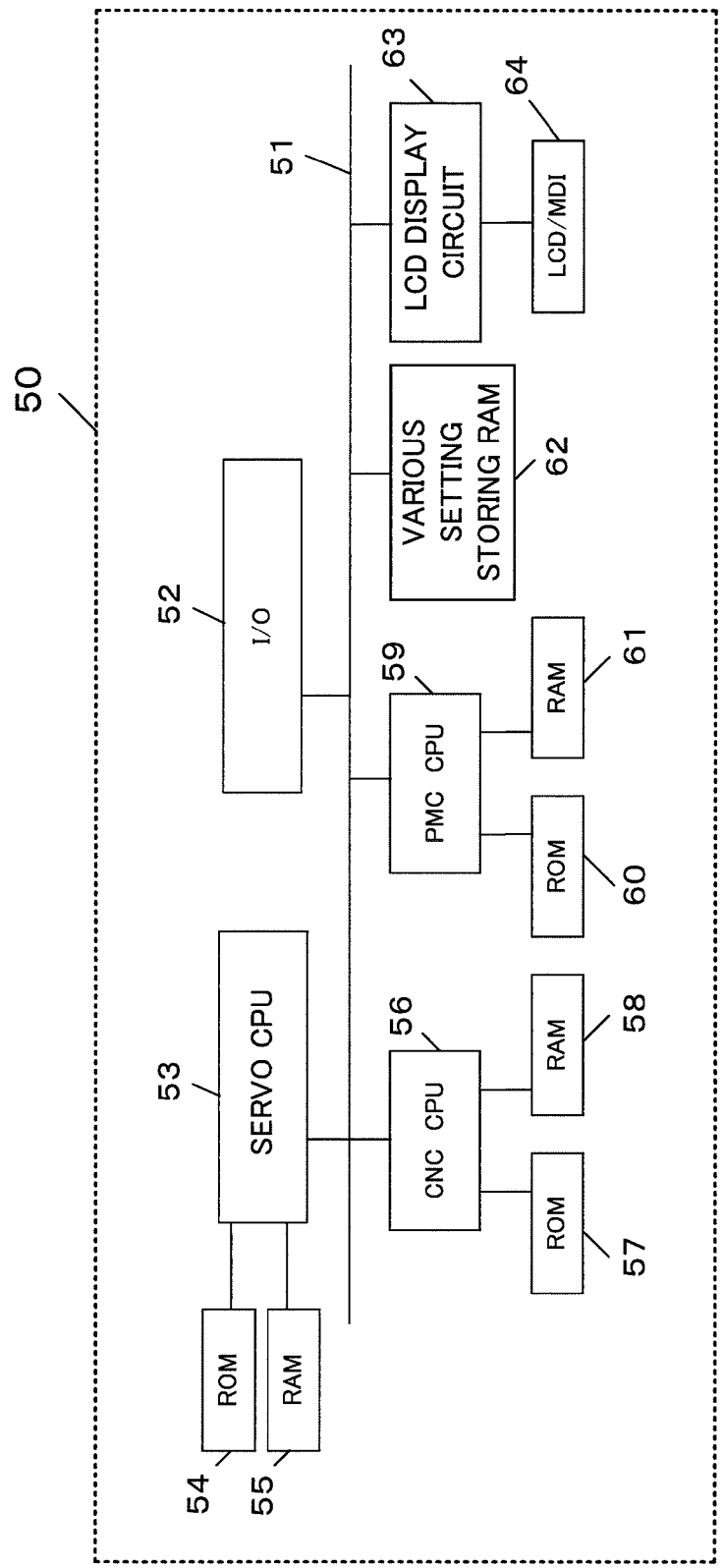
FIG. 2 is a view describing a structure of a controller of the injection molding machine in FIG. 1.

The controller 50 of the injection molding machine 1 has a CNC-CPU 56 which is a microprocessor for a numerical control, a PMC-CPU 59 which is a microprocessor for a programmable machine controller, and a servo CPU 53 which is a microprocessor for a servo control, and is structured such that information communication can be carried out between the microprocessors by selecting mutual input and output via a bus 51, as shown in FIG. 2.

To the servo CPU 53, there are connected a ROM 54 which stores a control program dedicated for a servo control carrying out process of a position loop, a speed loop and an electric current loop, and a RAM 55 which is used for temporarily storing data. Further, to the servo CPU 53, there are connected two servo amplifiers 45 and 46 (FIG. 3) which drive the injecting motor 13 connected to an injection axis on the basis of a command (a PWM command) from the servo CPU 53, and a servo amplifier 47 which drives the screw rotating motor 16 connected to a screw rotary axis, and the outputs from the position/speed detectors 14 and 17 attached to the respective servo motors 13 and 16 are fed back as position/speed feedback to the servo CPU 53.

The servo amplifier 41 and the servo amplifier 43 are respectively connected to the mold opening and closing motor 26 which drives a mold opening and closing axis opening and closing the mold 32, and the ejection motor 29 for the ejector axis which ejects the molded article out of the movable side mold of the mold 32. The outputs from the position/speed detectors 27 and 30 which are respectively attached to the mold opening and closing motor 26 and the ejection motor 29 are fed back as position/speed feedback to the servo CPU 53.

To the PMC-CPU 59, there are connected a ROM 60 which stores a sequence program controlling a sequence motion of the injection molding machine 1, and a RAM 61 which is used for temporarily storing computing data. To the CNC-CPU 56, there are connected a ROM 57 which stores various programs such as an automatic operation program wholly controlling the injection molding machine, and a control program achieving an interruption control of the motor power of the injection molding machine in association with the present invention, and a RAM 58 which is used for temporarily storing computing data.

A various setting storing RAM 62 is a nonvolatile memory, and is a molding data storing memory which stores molding conditions and various set values with regard to the injection molding work, parameters and macro variables. An LCD/MDI (a manual data input device with liquid crystal display device) 64 is connected to the bus 51 via an LCD display circuit 63, and is structured such as to carry out selection of a function menu and an input operation of various data. Further, the LCD/MDI 64 is provided with numeral value keys for inputting numerical data and various function keys.

According to the structure of the injection molding machine 1 mentioned above, the PMC-CPU 59 controls the sequence of the whole of the injection molding machine, the CNC-CPU 56 carries out distribution of movement command in relation to the servo motor of each of the axes on the basis of the operation program stored in the ROM 57 and the molding conditions stored in the various setting storing RAM 62, and the servo CPU 53 executes a digital servo process on the basis of the movement commands distributed to each of the axes and the position and speed feedback signals detected by the position/speed detectors 14, 17, 27 and 30, outputs a drive command (PWM command) to the servo amplifiers 45, 46, 47, 41 and 43, drives and controls the injecting motor 13, the screw rotating motor 16, the mold opening and closing motor 26 and the ejection motor 29, which are all servo motors, and drives each of the mechanisms of the injection molding machine.

Figure 3:
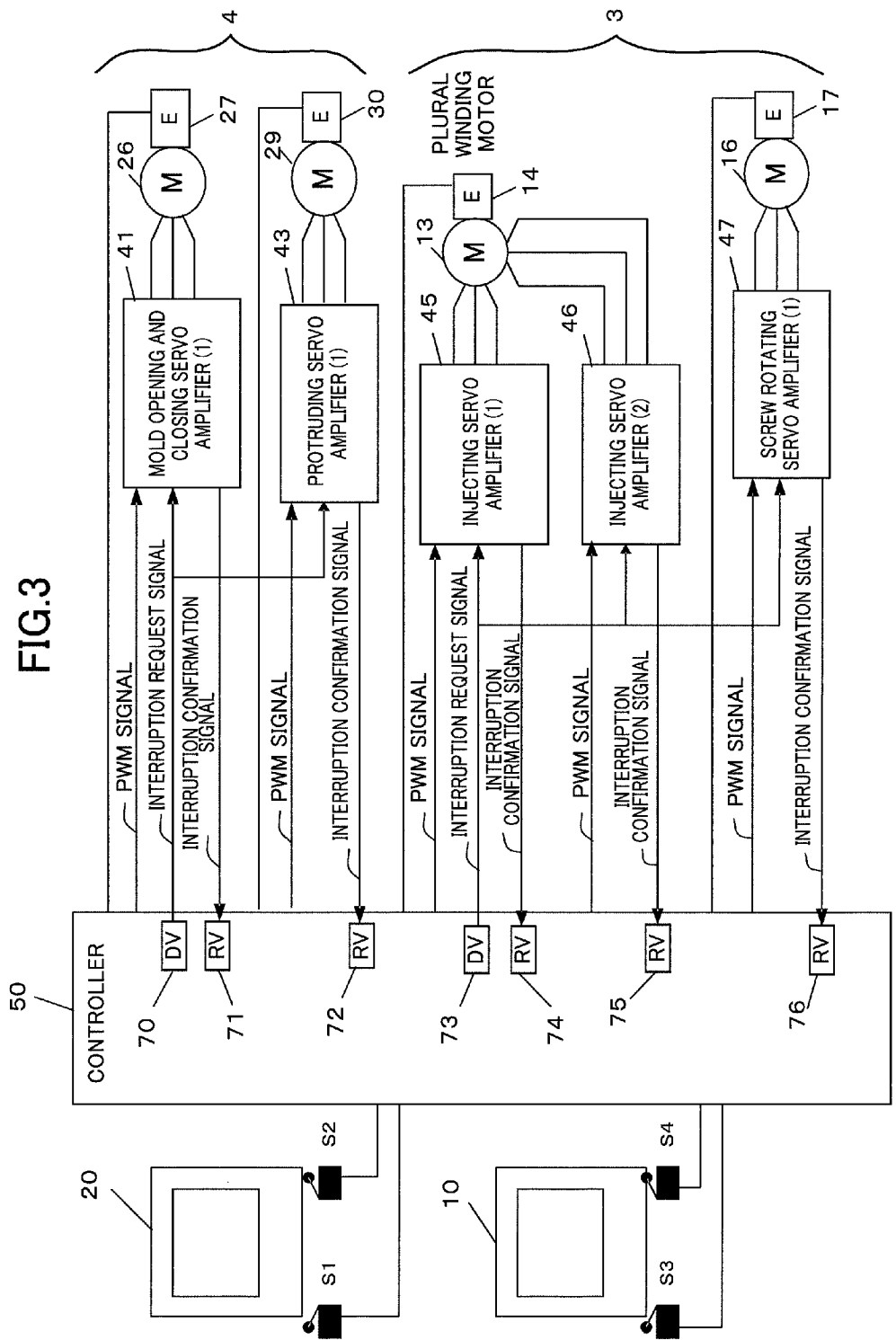
FIG. 3 is a view describing a mechanism in which a motor power interrupting device of the injection molding machine according to the present invention interrupts power of a servo motor.

As shown in FIG. 3, the injection molding machine 1 has a power interrupting means for interrupting in a lump a power of the servo motors of the respective mechanisms in the injection molding machine on the basis of one interruption request signal which is output from a transmitting means 70 of the controller 50 to a plurality of servo amplifiers 41 and 43, and one interruption request signal which is output from a transmitting means 73 of the controller 50 to a plurality of servo amplifiers 45, 46 and 47, and inputting an interruption conformation signal confirming that interruption is carried out in the respective servo amplifiers 41, 43, 45, 46 and 47, from the respective servo amplifiers 41, 43, 45, 46 and 47 to receiving means 71, 72, 74, 75 and 76 of the controller 50. In each of the servo amplifiers, the motor power to each of the servo motors is interrupted according to the interruption request signal from the controller 50. For example, the servo amplifier receiving the interruption request signal actuates an electromagnetic relay (not shown) which embeds a servo amplifier therein, and directly interrupts supply of the motor power to the servo motor. Alternatively, the servo amplifier interrupts the power of the PWM signal creating circuit within the servo amplifier on the basis of the interruption request signal and indirectly interrupts the supply of the motor power. The interruption request signals may be output in a lump to all the servo amplifiers 41, 43, 45, 46 and 47 of the injection mechanism portion 3 and the mold clamping mechanism portion 4.

The controller 50 of the injection molding machine 1 prepares information indicating "used/unused" of the servo amplifier per the respective servo amplifiers in the memory of the controller 50, with regard to the maximum number of servo amplifiers which can be controlled by the controller 50. FIG. 4 is a view describing the memory which stores the information of "used/unused" of the servo amplifier. In this example, "used/unused" (used or unused) information is stored in the memory of each of eight servo amplifiers of an injection molding machine, which includes the mold opening and closing servo amplifiers (1) and (2), the ejection servo amplifiers (1) and (2), the injecting servo amplifiers (1) and (2), and the screw rotating servo amplifiers (1) and (2). Among references numerals 41 to 48 in FIG. 4, reference numerals 41, 43, 45, 46 and 47 correspond to the motors 41, 43, 45, 46 and 47 shown in FIGS. 1 and 3.

Figure 5:
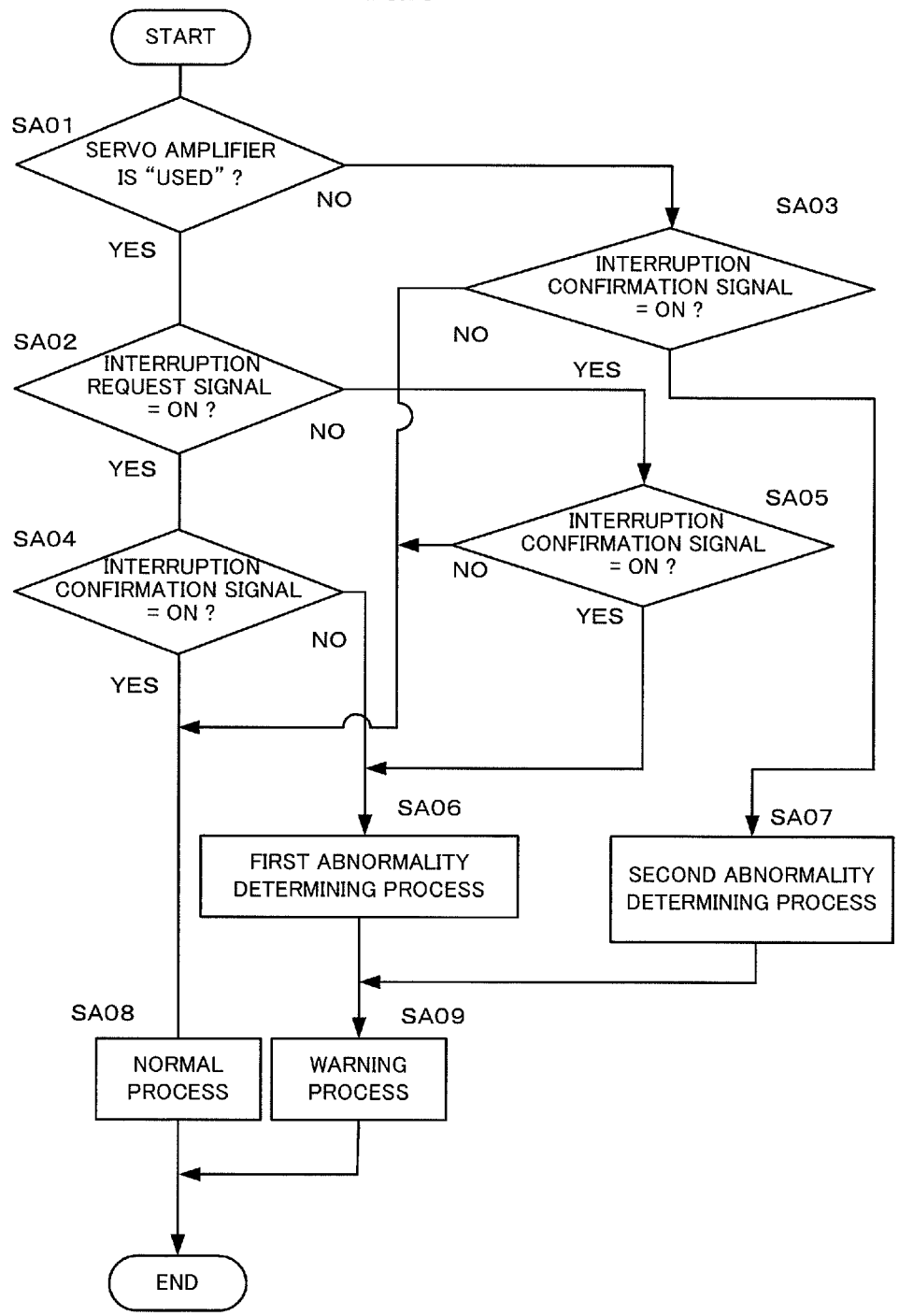
FIG. 5 is a flow chart describing a flow of a process that the motor power interrupting device of the injection molding machine according to the present invention interrupts the power of the servo motor.

FIG. 5 is a flow chart describing a flow of a process in which the motor power interrupting device of the injection molding machine according to the present invention interrupts the power of the servo motor.

When the signal indicating the open state of the safety door is input from the mold clamping portion side movable door opened state detection switch S1 or the injection portion side movable door opened state detection switch S4 in the injection molding machine 1 to an interface 52 of the controller 50, the input signal is transmitted to the PMC-CPU 59 via the bus 51, and execution of a process of the flow chart shown in FIG. 5 is started in the PMC-CPU 59. In the flow chart in FIG. 5, a process of one servo amplifier is shown, however, the process in FIG. 5 is carried out in all the amplifiers stored in the memory storing the information of "used/unused" of the servo amplifiers shown in FIG. 4.

[Step SA01] It is determined whether or not the servo amplifier is set to "used", and the process proceeds to step SA02 when the servo amplifier is set to be used (YES), and the process proceeds to step SA03 when the servo amplifier is set to be "unused" (NO). The setting of "used" or "unused" is previously stored in a memory (various setting storing RAM 62) as shown in FIG. 4.

[Step SA02] It is determined whether or not the interruption request signal is ON, and the process proceeds to step SA04 when the interruption request signal is ON (YES), and the process proceeds to step SA05 when the interruption request signal is not ON (NO).

[Step SA03] It is determined whether or not the interruption confirmation signal is ON, the process proceeds to step SA07 when the interruption confirmation signal is ON (YES), and the process proceeds to step SA08 when the interruption confirmation signal is not ON (NO).

[Step SA04] It is determined whether or not the interruption confirmation signal is ON, and the process proceeds to step SA08 when the interruption confirmation signal is ON (YES), and the process proceeds to step SA06 when the interruption confirmation signal is not ON (NO).

[Step SA05] It is determined whether or not the interruption confirmation signal is ON, and the process proceeds to step SA06 when the interruption confirmation signal is ON (YES), and the process proceeds to step SA08 when the interruption confirmation signal is not ON (NO).

[Step SA06] A first abnormality determining process is carried out. In other words, a process of determining that the interruption request signal is abnormal, the interruption confirmation signal is abnormal, or the servo amplifier is abnormal is carried out.

[Step SA07] A second abnormality determining process is carried out. In other words, a process of determining that the setting of "used/unused" of the servo amplifier is erroneous is carried out.

[Step SA08] A normal process is carried out, and this process is finished.

[Step SA09] A warning process is carried out, and this process is finished. The warning process displays on a display device (LCD of LCD/MDI 64) a result of the determination of the first abnormality determining process in step SA06 or a result of the determination of the second abnormality determining process in step SA07. Alternatively, the warning process displays warning on a warning lamp.

In the case where the specification of the injection molding machine 1 is changed, the information of "used/unused" of the servo amplifier can be changed. Accordingly, the controller 50 can be formed as a common structure regardless of the specification of the injection molding machine 1, and can cope with the change of the number of the servo amplifiers according to a difference of the specification of the injection molding machine 1 on the basis of the information of "used/unused".

The controller 50 of the injection molding machine 1 confirms the state of the interruption confirmation signal with regard to the maximum number of servo amplifiers which can be controlled by the controller 50, by using the information of "used/unused". Here, the maximum number which can be controlled by the controller 50 may be the maximum number of the servo amplifiers which can be controlled by the controller, or the number of the servo amplifiers of the machine kind where the number of the servo amplifiers becomes maximum in the lineup of the machine kinds of the injection molding machine mounting the same controller.

In other words, with regard to a servo amplifier for which the information of "used" is stored, if an interruption confirmation signal input from the servo amplifier to the controller 50 is ON or OFF in an interlocking manner when the output of the interruption request signal from the controller 50 to the servo amplifier is ON or OFF, it is possible to recognize that the interruption is normally carried out. On the contrary, if the interruption confirmation signal input from the servo amplifier to the controller 50 is not ON or OFF in an interlocking manner when the output of the interruption request signal from the controller 50 to the servo amplifier is ON or OFF, it is possible to recognize that any abnormality may be generated in the servo amplifier, or the interruption request signal or the interruption confirmation signal.

Further, with regard to the servo amplifier for which the information of "unused" is stored, if the interruption confirmation signal from the servo amplifier to the controller 50 is ON, it is possible to determine that the information of "used/unused" may be erroneous. On the other hand, if the interruption confirmation signal from the servo amplifier in relation to the controller 50 is OFF, it is possible to confirm that the serve amplifier is in the "unused" state as the information "used/unused" indicates, that is, a normal state.

In the case where the abnormality is detected, the warning is issued to an operator (refer to FIG. 5). Further, FIG. 3 shows an example in which one servo motor (the servo motor 13) is driven by a plurality of servo amplifiers (two servo amplifiers 45 and 46), however, the present invention can be applied to a case where one servo motor is driven by one servo amplifier. Further, the present invention can be applied to a case where one mechanism is actuated by a plurality of servo motors, and a plurality of servomotors are driven by respective independent servo amplifiers.

Figure 6:
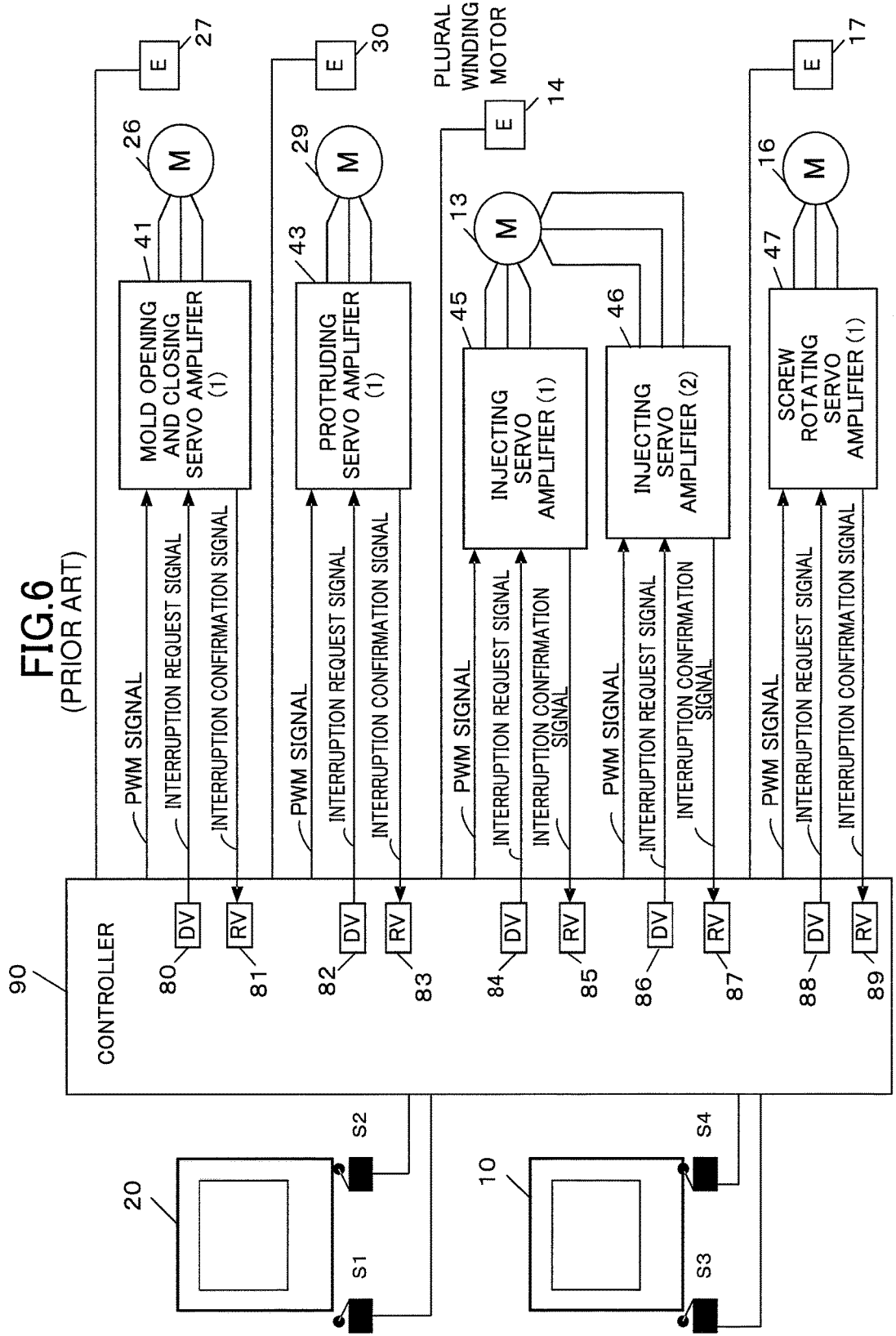
FIG. 6 is a view describing a mechanism for interrupting power of a conventional servo motor.

As mentioned above, in the embodiment of the present invention, since a plurality of servo motors are simultaneously interrupted their power in association with the opening and closing motion of the movable type door for each of the risky areas, the number of the interruption request signals can be reduced by outputting the interruption request signals to be output to each of the servo amplifiers in each of the risky areas from the controller in a lump (refer to FIG. 3). In the case where any abnormality is generated in the interruption request signal and the servo amplifier, this method can accurately detect the abnormality, can secure safety of the worker, and has an advantage that a cost for the machine can be reduced in comparison with the conventional case (refer to FIG. 6) where interruption request signals are prepared for each of the servo amplifiers. The power interrupting means can simultaneously interrupt the power of all the servo motors in the corresponding mechanism portions by one interruption signal which is output to the servo amplifiers from the controller. Further, in order to confirm that an interruption is carried in a servo amplifier, an interruption confirmation signal to be input from the servo amplifier to the controller is input to the controller, for each of the servo amplifiers. Therefore, even if any abnormality is generated in the power interruption in the servo amplifier, it is possible to easily detect the abnormality.

The invention claimed is:

1. A motor power interrupting device of an injection molding machine, the injection molding machine comprising:

n servo motors configured to actuate movable portions, wherein n≥2;

m servo amplifiers configured to drive the n servo motors, wherein m≥n; and a controller configured to control the m servo amplifiers, wherein the controller is configured to interrupt power of the servo motors by requesting power interruption to the servo amplifiers, wherein the controller comprises:

a memory which stores used/unused information indicating whether each servo amplifier among a maximum number of servo amplifiers controllable by the controller is used or unused; and a processor programmed to
output a common interruption request signal requesting power interruption to a plurality of servo amplifiers among the m servo amplifiers,
receive, from the plurality of servo amplifiers that have received the common interruption request signal, a power interruption confirmation signal confirming that the power of the servo amplifiers corresponding to the maximum number of servo amplifiers controllable by the controller is interrupted, and
determine, on the basis of (a) the interruption request signal, (b) the interruption confirmation signal and (c) the used/unused information, whether or not the power interruption is normally operated,
wherein
the processor is programmed to determine that a first abnormality exists when
the used/unused information corresponding to a servo amplifier among the maximum number of servo amplifiers controllable by the controller indicates that said servo amplifier is used, and
the interruption request signal sent to said servo amplifier is ON, and
the interruption confirmation signal returned from said servo amplifier in response to the interruption request signal is OFF.

2. The motor power interrupting device of claim 1, wherein
the processor is programmed to output the common interruption request signal simultaneously to said plurality of servo amplifiers.

3. The motor power interrupting device of claim 1, wherein
the processor is programmed to output the common interruption request signal to all of the m servo amplifiers.

4. The motor power interrupting device of claim 1, wherein
the processor is further programmed to determine that the first abnormality exists when
the used/unused information corresponding to a servo amplifier among the maximum number of servo amplifiers controllable by the controller indicates that said servo amplifier is used, and
the interruption request signal sent to said servo amplifier is OFF, and
the interruption confirmation signal returned from said servo amplifier in response to the interruption request signal is ON.

5. The motor power interrupting device of claim 4, wherein
the first abnormality indicates an abnormality in said servo amplifier, or the interruption request signal or the interruption confirmation signal.

6. The motor power interrupting device of claim 4, wherein
the processor is programmed to determine that a second abnormality exists when
the used/unused information corresponding to a servo amplifier among the maximum number of servo amplifiers controllable by the controller indicates that said servo amplifier is unused, and
the interruption confirmation signal returned from said servo amplifier in response to the interruption request signal is ON.

7. The motor power interrupting device of claim 6, wherein
the second abnormality indicates that the used/unused information corresponding to said servo amplifier is erroneous.

8. The motor power interrupting device of claim 6, wherein
the processor is further programmed to determine that the power interruption is normally operated when
the used/unused information corresponding to a servo amplifier among the maximum number of servo amplifiers controllable by the controller indicates that said servo amplifier is used, and
the interruption request signal sent to said servo amplifier is ON, and
the interruption confirmation signal returned from said servo amplifier in response to the interruption request signal is ON.

9. The motor power interrupting device of claim 8, wherein
the processor is further programmed to determine that the power interruption is normally operated when
the used/unused information corresponding to a servo amplifier among the maximum number of servo amplifiers controllable by the controller indicates that said servo amplifier is used, and
the interruption request signal sent to said servo amplifier is OFF, and
the interruption confirmation signal returned from said servo amplifier in response to the interruption request signal is OFF.

10. The motor power interrupting device of claim 9, wherein
the processor is further programmed to determine that the power interruption is normally operated when
the used/unused information corresponding to a servo amplifier among the maximum number of servo amplifiers controllable by the controller indicates that said servo amplifier is unused, and
the interruption confirmation signal returned from said servo amplifier in response to the interruption request signal is OFF.

11. The motor power interrupting device of claim 1, wherein the used/unused information stored in the memory is changeable.

12. The motor power interrupting device of claim 1, wherein the used/unused information stored in the memory is changeable in accordance with a specification of the injection molding machine.

13. The motor power interrupting device of claim 1, wherein, when a specification of the injection molding machine is changed, the used/unused information stored in the memory is changed.

* * * * *